UNITED STATES PATENT OFFICE.

EMILE PIRON, OF NEW YORK, N. Y.

METHOD OF RECOVERING AMMONIUM CHLORID.

1,386,278. Specification of Letters Patent. Patented Aug. 2, 1921.

No Drawing. Application filed September 2, 1920. Serial No. 407,743.

*To all whom it may concern:*

Be it known that I, EMILE PIRON, a subject of the King of the Belgians, residing at New York city, in the county of New York and State of New York, have invented certain new and useful Improvements in Methods of Recovering Ammonium Chlorid, of which the following is a specification.

My present invention relates to methods of recovering ammonium chlorid, particularly from gases from coke ovens and the like.

Heretofore it has been proposed to recover ammonium chlorid from coke ovens by passing the gases through a gas washer by which a dilute solution of ammonium chlorid is obtained. This has been found to be uneconomical in practice, because of the great amount of evaporation which is required in order to recover the ammonium chlorid.

It has also been proposed to recirculate such dilute solution through the washer until the solution becomes concentrated. But because the washer has been so situated that the hot gases are washed as soon as they leave the ovens and before they have had a chance to cool, the solution has been dirty and filled with tar and other substances which prevented crystallizing out the chlorid when the solution became concentrated, so that evaporation had to be resorted to, even though the solution was sufficiently concentrated to permit crystallization if it were not for the presence of the foreign substances.

One of the objects of my invention is to provide a method by which the ammonium chlorid may be obtained in a clean concentrated solution so that it may be readily crystallized, thus avoiding the necessity of evaporation.

With these and other objects in view, my invention consists of the methods hereinafter described and more particularly pointed out in the appended claims.

In order to obtain a clean solution of ammonium chlorid, free from substances which will prevent crystallization, I permit the gas from the ovens to cool without the direct application of water, until the temperature is at or about the dew point of the gas and then I wash the gas with flushing liquor water at substantially the dew point of the gas, at which temperature the ammonium chlorid in the gas is most readily dissolved in the water. In one manner of carrying out my invention in practice, the gas from several ovens flows into a gas main which is of sufficient length to cool the gas to the desired temperature before the washer is reached. A considerable portion of the tar in the gas is thrown down in the main and substantially none of the remaining tar and other substances, except the ammonium chlorid, in the gas, will be taken up by the wash water. The ammonium chlorid is taken up, however, almost completely and the solution thus obtained is so clean that when sufficiently concentrated, the chlorid will readily crystallize out, thus avoiding any evaporating process. The dew point of the gas is about 80° C. and the wash water is maintained at approximately the same temperature, so that the gas is not cooled further in passing through the washer.

Preferably, the gas washer, which may be of any preferred form, and in which the gas is passed through a spray or shower of the water or liquor, is arranged so as to take its water from a tank to which the water is returned after passing through the washer. In other words, I establish a circulating system, which includes the tank and the gas washer, through which the water is repeatedly circulated so that by reason of its continually taking up more and more of the ammonium chlorid from the gas, the solution becomes more and more concentrated. I continue this circulation until the concentration has reached a point near to the crystallization of the chlorid of ammonium when I discontinue the circulation and draw off this water in any suitable crystallizing apparatus, and crystallize out the ammonium chlorid. While this is being done, I provide another tank from which the water is circulated through the washer as before. In other words, preferably, I provide a pair of tanks, one of which is in use in connection with the washer at a time, the other being thrown into use when the water in the first tank has reached the desired degree of concentration. After this concentrated water is drawn off from the first tank, it is filled with fresh water or liquor ready for operation as soon as the water in the second tank has reached the desired degree of concentration.

As the art heretofore has been practised, flushing water has been permitted to flow through the gas mains from the ovens in order to keep the tar which deposits therein in a fluid condition. The gases from the ovens contain a small percentage of oxygen which, if it contacts with the tar in the mains when the tar is at a high temperature, will cause oxidation and consequently hardening of the tar and the ultimate clogging of the main. Hence flushing water has been used to lessen the temperature of the tar and prevent its hardening. When this flushing water enters the collecting main, it absorbs by far the greater portion of the ammonium chlorid and also many organic compounds, such as the cresols, which the gas contains. Consequently the resulting liquor, even when concentrated, contains so much of substances other than the ammonium chlorid that crystallization is impossible. Furthermore, because ammonium chlorid is unstable when heated, attempts to evaporate the concentrated solution have resulted in failure, because the nascent chlorin released attacks and destroys the evaporating apparatus and pollutes the atmosphere.

If, however, the gas is permitted to flow through a pipe which has a vertical portion adjacent the ovens high enough to permit the gas to cool to, say, 350° C. before passing into a horizontal collecting main, as has been suggested heretofore, I have found that any tar deposited in the horizontal portion connected to these vertical pipes will be washed by the flow of dry tar, because the temperature of the gas and tar is below the temperature of intense hardening. Hence, with such an arrangement, by providing vertical or stand pipes and a suction pipe long enough, I can permit the gas to cool to the dew point of the gas without the use of flushing water in the collecting main and consequently without the absorption of any of the ammonium chlorid or other substances in the flushing water, such as is experienced when flushing water is used. When therefore, the gas passes through the washer in my process, only the ammonium chlorid is removed, the temperature of the wash water being kept within sufficiently narrow limits to insure this. The resulting solution is a clean one which, when concentrated sufficiently, will cause a crystallization of the ammonium chlorid when cooled.

I claim:

1. The method of recovering ammonium chlorid from coke oven gases, which consists in reducing the temperature of the gases without the addition of water to about the dew point thereof, and then washing the gases with liquid to absorb the ammonium chlorid contained in the gases.

2. The method of recovering ammonium chlorid from coke oven gases, which consists in reducing the temperature of the gases without the addition of water to about the dew point thereof, and then washing the gases with liquid to absorb the ammonium chlorid contained in the gases, recirculating the solution through the washer until the concentration reaches a high degree and then crystallizing out the ammonium chlorid therefrom.

3. The method of recovering ammonium chlorid from coke oven gases, which consists in reducing the temperature of the gases without the addition of water to about the dew point thereof, then washing the gases with liquid to absorb the ammonium chlorid contained in the gases, recirculating the solution through the washer repeatedly until the concentration reaches a high degree, then withdrawing the liquid from the washing system and crystallizing out the ammonium chlorid therefrom, and continuing the washing with a fresh supply of liquid.

4. The method of recovering ammonium chlorid from coke oven gases, which consists in reducing the temperature of the gases without the addition of water to about the dew point thereof, then washing the gases with liquid to absorb the ammonium chlorid contained in the gases, recirculating the solution through the washer repeatedly until the concentration reaches a high degree, then stopping the circulation of such liquid through the washer and crystallizing out the ammonium chlorid therefrom, while continuing the washing with a fresh supply of liquid.

EMILE PIRON.